L. E. TRUESDELL.
Motors.

No. 136,286.        Patented Feb. 25, 1873.

UNITED STATES PATENT OFFICE.

LUCIUS E. TRUESDELL, OF WARREN, MASSACHUSETTS.

IMPROVEMENT IN MOTORS.

Specification forming part of Letters Patent No. 136,286, dated February 25, 1873.

*To all whom it may concern:*

Be it known that I, LUCIUS E. TRUESDELL, of Warren, in the county of Worcester and State of Massachusetts, have invented certain Improvements in Hydraulic Motors, of which the following is a specification, reference being had to the accompanying drawing, in which—

Figure 1:
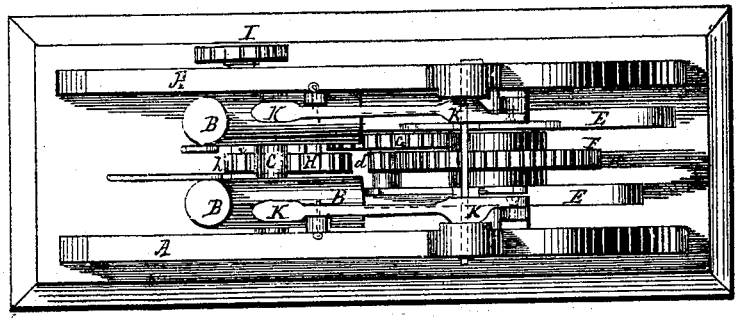
Figure 2:
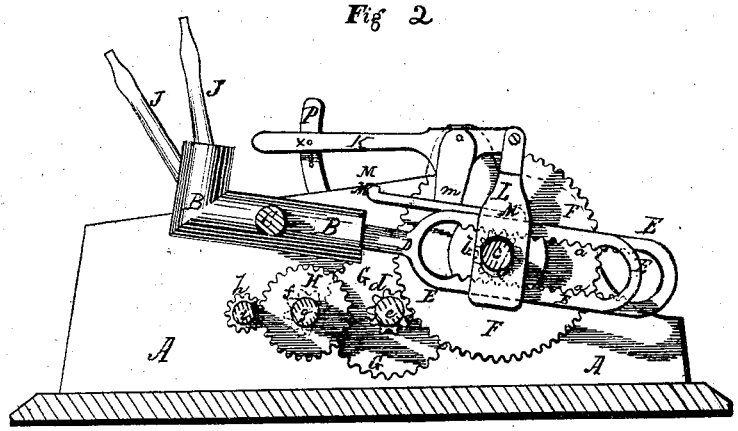

Figure 1 represents a plan of my improved motor, and Fig. 2 a vertical longitudinal section of the same.

My invention has for its object the utilization of the slow but immense power of a hydraulic engine; and it consists in combining with the piston of the hydraulic engine suitable devices, in connection with a system of accelerating gears, by means of which a portion of the power of the engine is converted into motion and thereby made serviceable as a prime motor to the ordinary purposes of life for which steam-engines are now used.

To enable others skilled in the art to make, construct, and use my improvement, I will now proceed to describe its parts in detail, omitting a particular description of such of these as are non-essential to a full understanding of the invention; here premising that for this purpose any hydraulic engine of suitable form, power, and construction may be used, as the improvement does not consist in any change in the engine itself, but only in the mode of applying its powers as a motor or driving engine.

The machinery is represented as being supported on two side frames, A, suitably secured and braced to the floor of the workshop or manufactory, or to the platform of a car or wagon. B represents two hydraulic engines pivoted to the side frames A, the two being connected together by means of a pivotal cross-bar, C, so that each may turn independently of the other. To the piston of each of these engines is secured a stout piston-rod, D, the outer end of which is bifurcated so as to form a yoke or collar, E, which carries a toothed rack-bar, *a*, on its upper and under side. Each of these toothed yokes E embraces a toothed pinion, *b*, mounted on a shaft, *c*, which has its bearings in the sides A of the frame. Between the two pinions *b* on the same shaft is firmly keyed or otherwise secured a large gear-wheel, F, the teeth of which mesh into the teeth of a small pinion, *d*, keyed fast to a shaft, *e*, and which also has its bearings in the sides A of the frame. On this same shaft *e* is firmly secured a large gear-wheel, G, the teeth of which, in turn, mesh with the teeth of another small pinion, *f*, mounted on a shaft, *g*, having its bearings also in the sides A of the frame. On the shaft *g* is mounted another gear-wheel, H, the teeth of which mesh with those of a small pinion, *h*, mounted on a shaft, *i*, having its bearings in the sides A of the frame. This shaft may, if desired, be also provided with another gear-wheel, to mesh into the teeth of another small pinion, and may, in the same way, be multiplied as often as may be desired within the power of the engine, in order to accelerate the motion of the last shaft; and so with regard to the size of the gear-wheels and pinions for the same purpose, as they may be made of any required size with relation to each other; but as a rule the gear-wheels will be made gradually smaller from the first, F, to the last, as shown in Fig. 2, while the pinions will remain about the same size. Whatever the number of gear-wheels and pinions, the shaft of the last one (in this case being shaft *i*) will carry the driving-pulley I, from which motion will be imparted to the machinery to be driven. Or, where it is intended to be used as a means of driving a wagon or street-car, the ends of the last shaft *i* will form the axle to which the driving-wheels will be secured, and thereby impart motion to the wagon. J J represent the levers of the pumps which operate the engines, one only being used at a time, until the piston D with its rack-bar *a* has been forced out to the full length of its stroke, when the latter will be thrown out of gear with its pinion *b* by means of the lever K, thereby freeing the shaft C from any connection with that engine; this done, the other rack-bar, by its lever J, is thrown into gear with its pinion *b*, thereby completing its connection with the shaft C, and the other engine worked until it has also reached the full length of its stroke, when the same operation will be gone through with it, and the other one again thrown into gear, which meanwhile had been discharged of its water, and its piston D brought back ready to be again operated on as before.

In order that these operations may be properly performed the distance between the teeth $a$ of the rack-yoke is made sufficiently great to allow the pinion $b$ to revolve without engaging with either of them, so that when raised or depressed by the action of the lever K it may be drawn back without interfering with the teeth of the pinion $b$. This necessitates the use of a device in connection with the lever K, which, while always in position to raise or lower the yoke, will allow the latter to slide freely back and forth. This is effected by means of a clamp, L, pivoted to the end of the lever K, having two projections on its face, which loosely embrace the upper and lower sides of the yoke E, forming, as it were, a sliding guide-way for the yoke, but through which it can always be raised or lowered. The levers J are both pivoted to the sides A of the frame by means of a pin, $l$, which passes through both. This raising and lowering of the yokes involves the accommodating of the engines to such a motion, and hence the reason of pivoting them to the sides of the frame. The use of two racks, $a$, on each yoke enables the direction of the motion to be changed, as when geared with the upper rack it will cause the pinion $b$ to revolve in one direction, and when geared with the lower one to revolve in the opposite direction. M represents two stops secured to the upper side of the yokes E, which, acting on a stop, $m$, formed on the under side of the levers K, according to the direction in which they are moving, will cause the lever K to throw the racks $a$ in or out of gear with the pinions $b$.

The operation is as follows: The operator seizes hold of one of the pump-handles and operates it until the piston-rod D with its rack-bar E has been forced out to the full length of its stroke, on which, by means of the stud-pin M acting on the lever K through its projection $m$, the rack $a$ will be thrown out of gear with the driving-pinion $b$ ready to be returned in the usual manner to commence a new stroke. Meanwhile, as soon as the one is thrown out the operator throws the rack $a$ of the other engine in gear by means of the other lever, K, and operates the pump-handle of that engine until its piston has also been forced out to the full end of the stroke, when the same operation is gone through with it in order to return it for another advance; this done, the first piston-rack is again thrown in gear, and so on alternately, the one after the other; or, instead of performing these operations separately, devices can be arranged to perform them automatically, so that the throwing out of gear of the one rack, $a$, will at the same time and by the same act automatically throw the other into gear, and vice versa.

Now, from what has been said, it will be seen that the advance of the piston-rack $a$, when in gear with the driving-pinion $b$, will cause the latter to revolve, carrying with it the large driving-gear F, and through it communicate a constant acceleration of motion to the other gears, pinions, and shafts until it culminates in the required velocity in the last shaft $i$, from which motion is imparted to the machinery to be driven through the driving-pulley I; or, in case of a wagon or car, by means of wheels keyed to the said shaft $i$.

In order to keep the racks in gear during their advance, a pin may be passed through the lever K into a hole formed for the purpose in a standard, P, erected on the side A of the frame. For this purpose there is a series of holes arranged in said standard, one for holding the upper rack in gear, one for the lower rack, and another for holding the rack out of gear; but when such is used the automatic arrangement for throwing the racks $a$ in and out of gear will be dispensed with.

Having thus described my invention, what I claim as new, and desire to secure by Letters Patent, is—

1. The combination, substantially as described, of a series of accelerating-gears with the piston of a hydraulic engine, for the purpose set forth.

2. The combination of a piston carrying two rack-bars, $a$, with a driving-gear, $b$, operated in the manner and for the purpose set forth.

3. The combination, substantially as described, of a lever, K, and clamp-connection L with the piston-rod D E of a pivoted hydraulic engine, B, for the purposes set forth.

4. The combination of the piston-rod studs M with the projection $m$ of the lever K, for the purpose set forth.

LUCIUS E. TRUESDELL.

Witnesses:
P. HANNAY,
D. G. STUART.